United States Patent
Wang et al.

(10) Patent No.: US 8,509,422 B2
(45) Date of Patent: Aug. 13, 2013

(54) ENCODING STATUS SIGNALS IN DC VOLTAGE LEVELS

(75) Inventors: Allen Wang, Plano, TX (US); Karl A. Gundal, Allen, TX (US); Shantharam Suratkal Shenoy, Plano, TX (US); Suhas S. Gandhi, Lake Mary, FL (US)

(73) Assignee: iPhotonix, LLC, Richardson, TX (US)

( * ) Notice: Subject to any disclaimer, the term of this patent is extended or adjusted under 35 U.S.C. 154(b) by 1280 days.

(21) Appl. No.: 12/173,862

(22) Filed: Jul. 16, 2008

(65) Prior Publication Data

US 2009/0022306 A1    Jan. 22, 2009

Related U.S. Application Data

(60) Provisional application No. 60/961,516, filed on Jul. 20, 2007.

(51) Int. Cl.
H04M 1/00 (2006.01)
G08B 1/00 (2006.01)

(52) U.S. Cl.
USPC ..................... 379/413.03; 340/333

(58) Field of Classification Search
None
See application file for complete search history.

(56) References Cited

U.S. PATENT DOCUMENTS

| | | | |
|---|---|---|---|
| 2002/0080010 A1* | 6/2002 | Zhang | 340/310.06 |
| 2004/0153543 A1* | 8/2004 | Thomas | 709/225 |
| 2006/0034449 A1* | 2/2006 | Joerger | 379/413 |
| 2006/0192434 A1* | 8/2006 | Vrla et al. | 307/64 |
| 2007/0195823 A1* | 8/2007 | Biegert | 370/485 |
| 2008/0005601 A1* | 1/2008 | Diab | 713/300 |
| 2008/0051158 A1* | 2/2008 | Male et al. | 455/572 |

* cited by examiner

Primary Examiner — Simon Sing
Assistant Examiner — Jeffrey Lytle
(74) Attorney, Agent, or Firm — Slater & Matsil, L.L.P.

(57) ABSTRACT

System and method for encoding status signals in DC voltage levels is provided. The value of a status indicator received on status signals are encoded as a series of pulses, and the voltage level from a power source, such as a power supply or a rechargeable battery, is modulated in accordance with the series of pulses. In an embodiment, the voltage level from the power source is varied between two levels, both of which are acceptable power levels. The drops in the voltage levels represent the value of the status indicator. On the receiving end, the power signal is translated into a logical voltage level and converted to a digital value. The digital value is decoded into the status indicator.

14 Claims, 7 Drawing Sheets

ENCODING STATUS SIGNALS IN DC VOLTAGE LEVELS

This application claims the benefit of U.S. Provisional Application No. 60/961,516, filed on Jul. 20, 2007, entitled "Using Encoded DC Voltage Level Variations to Deliver Power Status Signals," which application is hereby incorporated herein by reference.

TECHNICAL FIELD

The present invention relates to electronic equipment and, more particularly, to a system and method for encoding status signals in DC voltage levels.

BACKGROUND

The subscriber end of a Fiber-To-The-Home (FTTH) or Fiber-To-The-Premises (FTTP) network terminates a fiber optic cable in an optical network terminal (ONT) positioned at an interior or exterior location on a subscriber's premise. As a result, a substantial amount of bandwidth can be made available to the subscriber to provide a variety of services, such as plain old telephone service (POTS), Internet access service, and television service.

One of the requirements of a POTS provider is to insure that telephone service is available for a period of time, such as eight hours, after a power failure. In an FTTH network, this is accomplished by providing a battery backup at the subscriber's premise. Thus, when power is lost, the battery backup at the subscriber's premise provides power to the ONT at the subscriber's premise to maintain the telephone service for the required period of time.

Although current-generation batteries perform for extended periods of time, even the best batteries will need to be replaced a number of times during the expected lifetime of an ONT. To insure uninterrupted service, the batteries are continuously monitored. As a result, when the performance of a battery falls below a predefined limit, the condition is detected and reported to the central office.

FIG. 1 is a block diagram that illustrates the subscriber end of an FTTH network. As shown in FIG. 1, the FTTH network includes a power injector 102, a power splitter 104, an ONT 106, and data terminal equipment (DTE) 108. The power injector 102 is located in the subscriber living area and the power splitter 104 and the ONT 106 are typically remotely collocated on the outside wall, garage, or basement. Two cables are used to connect the power injector 102 to the remotely located power splitter 104 and ONT 106. A category-5 (Cat5) cable connects the power injector 102 to the power splitter 104 for data and power, and a separate five-conductor cable connects the power injector 102 to the ONT 106 for battery status information.

Twisted-pair cables are commonly installed in residential settings to provide data service, such as Internet service. Newer homes utilize twisted-pair cable (e.g., Cat3/Cat5/Cat5e/Cat6) that usually has four pairs of wires, or four twisted pairs. In many cases, however, particularly in older homes, the twisted-pair cable has only two pairs of wires, one to transmit the data and the other to receive the data. Power is remotely delivered to the power splitter 104 over the same pair of wires as specified in the Power-over-Ethernet (PoE), IEEE802.3af standard. For this discussion two-pairs of wires are assumed, but it is understood that the concepts described herein may be applied to any number of wires. Data is transparently passed between the ONT 106 and the DTE 108 over the same twisted pairs. In an alternative embodiment, other types of cables, such as coaxial cable, may be used instead of Ethernet cable.

As shown in FIG. 2, the power injector 102 includes a power supply 202 that is connected to a power sourcing device (PSE) 204 at input node N1. The power supply 202, which plugs into a standard AC wall outlet, converts 115 VAC into a DC voltage, such as 54V.

In addition, the power injector 102 includes a battery module 206 that is also connected to the power sourcing device 204 to place a lower DC battery voltage, such as 48V, in the event that power supply 202 can no longer provide the necessary voltage. The power supply 202 and the battery module 206 are commonly referred to as an uninterruptable power supply (UPS).

The voltage at the input node N1 of the power sourcing device 204 is injected on the two pairs of Ethernet cable at an output node N2 of the power sourcing device 204. The power sourcing device 204 manages the power delivery to remotely powered devices as per IEEE 802.3af. The positive supply is placed on one pair and negative supply is placed on the other pair of the cable via center taps of data interfacing transformers 208.

The battery module 206 includes a rechargeable battery 210 that, when fully charged, outputs the lower DC battery voltage (12V). The rechargeable battery 210 can be implemented with any number of commercially available rechargeable batteries, such as lead acid, lithium ion, and other similar types of batteries.

The battery module 206 also includes a charge control circuit 212 that is connected to the rechargeable battery 210. When the power supply 202 fails, the charge control circuit 212 passes the DC voltage from the rechargeable battery 210, via a DC-to-DC converter within the charge control circuit 212, to the input node N1 of the power sourcing device 204. On the other hand, when the power supply 202 is functioning, the charge control circuit 212 can recharge the battery by passing a current from the power supply 202 to the rechargeable battery 210.

In addition, the battery module 206 includes a voltage sensor 214 that is connected to the input node N1 of the power sourcing device 204 to sense the magnitude of the voltage. Further, the battery module 206 includes a controller 216 that is connected to the charge control circuit 212 and the voltage sensor 214. The controller 216 can be implemented with a microprocessor or as logic implemented in, for example, a gate array or an application specific integrated circuit (ASIC). The charge control circuit 212, the voltage sensor 214, and the controller 216 each receive operating power from the rechargeable battery 210 which, as noted above, is charged by the power supply 202.

In operation, the voltage sensor 214 detects the voltage on the input node N1 of the power sourcing device 204 and transmits a value that represents the sensed voltage to the controller 216. During normal operation, the voltage sensor 214 detects the voltage output by the power supply 202 (e.g., 54V) and transmits a corresponding value to the controller 216. In this case, the controller 216 commands the charge control circuit 212 to recharge battery if needed.

On the other hand, when the voltage from power supply is no longer available, the voltage sensor 214 detects the falling voltage and transmits a value that represents the voltage to the controller 216. When the falling voltage reaches a predetermined level, such as 47V, the controller 216 commands the charge control circuit 212 to place the voltage from the rechargeable battery 210 on the input node N1 of the power sourcing device 204.

In addition to controlling the charging and use of the rechargeable battery 210, the controller 216 also reports the status of the rechargeable battery 210. The controller 216 can report, for example, whether the power supply 202 or the rechargeable battery 210 is providing a voltage to input node N1 of the power sourcing device 204, and whether or not the rechargeable battery 210 is charged or needs charging. Further, the controller 216 can determine and report whether the rechargeable battery 210 needs replacing by measuring how long it takes for the rechargeable battery 210 to become charged, as well as other factors that indicate the state of the rechargeable battery 210.

As further shown in FIG. 2, the power injector 102 also includes a battery status cable 218 that is connected to the controller 216 of the battery module 206. The battery status cable 218 has a number of wires, such as five, that provides battery status information from the controller 216 to the ONT 106. The power (either from the rechargeable battery 210 or the power supply 202) is injected in a data cable 220 (e.g., an Ethernet cable), which is connected to the power splitter 104. Both the power injector 102 and the power splitter 104 pass data signals transparently between the ONT 106 and the data terminating equipment 108. (An integrated access device (IAD) or a residential gateway (RG) can be used in lieu of the ONT 106.)

FIG. 3 illustrates the power splitter 104 in greater detail. As shown, the power splitter 104 splits the power from the data cable 220 via the center taps of transformers 310 and delivers regulated 12V to the ONT 106. The power splitter 104 includes a powered-device (PD) chip 302 that connects to an input node N3 via a diode bridge 304. The input node N3 is connected to the same power carrying wire pairs in the data cable 220. The diode bridge 304 ensures that the PD chip 302 is polarity protected. The PD chip 302 provides in-rush current limiting, over voltage protection, and DC signatures to allow adequate power delivery from the remote end as per IEEE 802.3af. After proper authentication, the PD chip 302 passes the power (voltage) to a DC-to-DC converter 306, which supplies the isolated voltage 12V to an output node N4. The isolated voltage 12V at the output node N4 is coupled to the input node N5 of the ONT 106 via a power cable 308. The power splitter 104 transparently passes the data on the same pairs of cable to the ONT 106 at an output node N6. The power splitter 104 can also optionally be integrated into the ONT module 106.

FIG. 4 illustrates a detailed view of the ONT 106. As shown, the ONT 106 includes a voltage sensor 402 and last-gasp circuit 404, both of which are connected to the input node N5, which is connected to the node N4 in the power splitter 104 via the power cable 308 (see FIG. 3). The input node N5 also powers the rest of the ONT 106.

Further, ONT 106 includes a controller 406 that is connected to the battery status cable 218, the voltage sensor 402, and the last-gasp circuit 404. As discussed above, the voltage sensor 402, the last-gasp circuit 404, and the controller 406 each receives operating power from the power supply 202 or the rechargeable battery 210, depending on which source is functioning.

When the power supply 202 and the rechargeable battery 210 (see FIG. 2) both fail to provide the voltage needed by the ONT 106, the voltage sensor 402 detects and reports this condition to the last-gasp circuit 404. The last-gasp circuit 404, in turn, outputs a voltage to the ONT circuit for a period of time that allows the controller 406 to gracefully shut down. The last-gasp circuit 404 can utilize, for example, a capacitor (not shown) to store a finite amount of energy to be delivered to the ONT circuitry. The ONT 106 can be implemented without last gasp circuit.

To prevent a total loss of power, the status of the rechargeable battery 210 (see FIG. 2) is continuously monitored. As noted above, the controller 216 of the power injector 102 can output status signals that indicate, for example, whether the power supply 202 or the rechargeable battery 210 is providing a voltage to the second pair of wires, whether or not the rechargeable battery 210 is charged or needs charging, and whether or not the rechargeable battery 210 needs replacing.

Referring back to FIG. 4, the controller 406 of the ONT 106 receives the battery status signals from the controller 216 in the power injector 102 and passes the status information along to the central office (not shown) as necessary. As a result, when the rechargeable battery 210 (see FIG. 2) begins to fail and needs replacing, the condition can be detected and the responsible party notified before total battery failure results.

As can be appreciated, the type of system described above requires two cables to be installed from the power injector 102 and the ONT 106, which is remotely located from the power injector 102. Installing the separate battery status cable, however, can become quite expensive and/or inconvenient in a subscriber setting. Thus, there is a need for a system and method of easily delivering battery status information from the power injector to the ONT.

SUMMARY OF THE INVENTION

These and other problems are generally solved or circumvented, and technical advantages are generally achieved, by preferred embodiments of the present invention which include systems and methods for encoding status signals in DC voltage levels.

In accordance with an embodiment of the present invention, a power and status distribution system is provided. The power and status distribution system comprises a power/status sending device and a power/status receiving device. The power/status sending device receives a status indicator and an input DC power signal and modulates the DC power signal in accordance with the status indicator thereby creating a modulated DC power signal. The power/status receiving device receives the modulated DC power signal, decodes the DC power signal to determine the status indicator, and provides a DC power signal to other elements. The status indicator may be provided to an optical network terminal management and control interface (OMCI).

In accordance with another embodiment of the present invention, a method of providing status information is provided. The method includes receiving a supply voltage and modulating the supply voltage to supply an output modulated voltage on one or more pairs of wires such that the output modulated voltage is modulated between two voltage levels, the modulation including a series of pulses representing an input status indicator.

In accordance with yet another embodiment of the present invention, a status encoder is provided. The status encoder includes a voltage modulator and an encoder. The voltage modulator is configured to couple to an input voltage source and to a power cable. The encoder is configured to couple to a battery module for receiving a status indicator and to the voltage modulator. The encoder is also configured to encode the status indicator as a series of pulses, and the voltage modulator is configured to modulate the input voltage source in accordance with the series of pulses to generate a modulated power signal on the power cable.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments of the present invention provide a system and method of delivering power source status signals over the same wires that is carrying power. Thus, embodiments can deliver battery status information to a network terminal, such as an ONT, an IAD, or an RG, without the installation of additional wiring.

Generally, as will be described in greater detail below, an embodiment of the present invention includes a status encoder having a supply voltage modulator and an encoder. The encoder receives battery status information and outputs a train of voltage modulating binary pulses that represent the battery status to the supply voltage modulator. The supply voltage modulator modulates the supply voltage, delivered by the power sourcing circuit, between two levels within the acceptable range of delivered voltages as per supplied binary values and their durations.

A power/alarm splitter terminal has an input node that is connected via a diode bridge to a PD chip and a status decoder. The status decoder includes a voltage translator, a voltage level sensor, and a decoder. The voltage level translator is connected to the split supply voltage after the diode bridge and maps the supply voltage modulated signal to a range of low logical level voltage swings. The level sensor senses swings and informs the decoder. The decoder intelligently determines the received alarm status signature with respect to steady state operating conditions. The decoder then recreates the status information as four separate isolated signals and a return signal to the ONT 106 for reporting to the management system via an optical network terminal management and control interface (OMCI).

It should be noted, however, that embodiments of the present invention are described herein in terms of providing status and power from a power splitter to an ONT only for illustrative purposes. One of ordinary skill in the art will appreciate that other embodiments of the present invention may be useful in any type of application in which power and status signals are transmitted between components.

Figure 5:
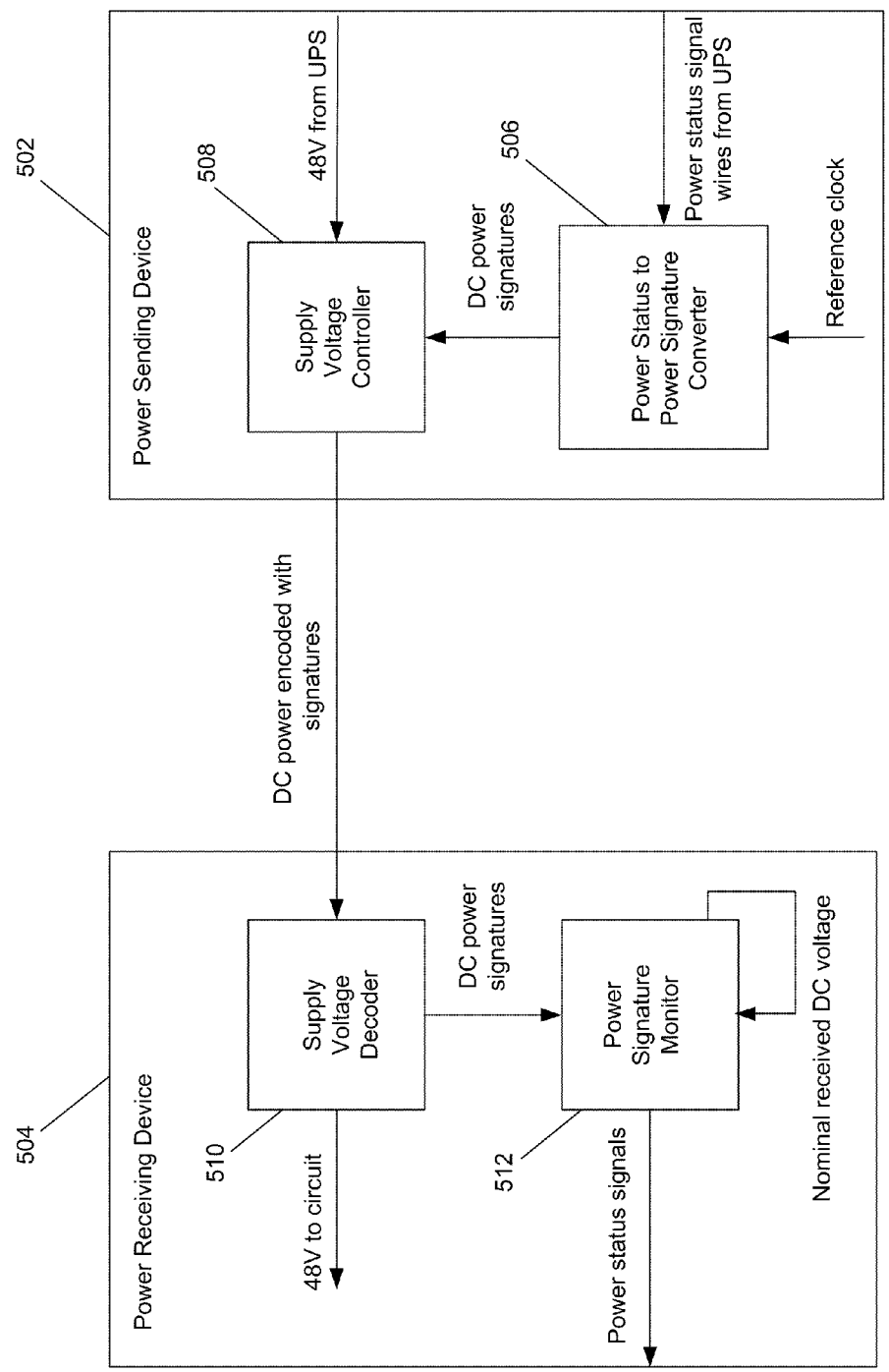
FIG. 5 is a block diagram of a network system that provides power encoded with status information in accordance with an embodiment of the present invention.

Referring now to FIG. 5, there is shown a high-level block diagram of a system that provides power encoded with status signatures in accordance with an embodiment of the present invention. Generally, a power sending device 502 provides power to a power receiving device 504 such that the power is encoded with voltage levels that indicate a signature such as a battery status. For example, in a typical FTTP application, there may be four different power statuses and many more well known alarms defined in typical UPS management information blocks (MIBs).

The specific power statuses are encoded as a decimal number, such as a two-digit decimal number. It may be preferable to combine the status indicators to provide additional information to the power receiving device 504. Due to the fact power statuses are reported autonomously without any acknowledgement, a unique code representing the persistent condition or conditions is repeatedly sent to ensure the delivery of the power status information.

The power sending device 502 includes a power status-to-power signature converter 506 and a supply voltage controller 508. The power statuses-to-power signature converter 506 receives a reference clock and power status from a power supply (not shown), such as a UPS and generates a DC power signature containing a series of pulses representative of the statuses. The supply voltage controller 508 encodes the DC power signature into the DC power.

Each pulse is generated by varying the DC voltage level by a fixed magnitude for a fixed duration. Consecutive pulses are used to convey the decimal value of each digit and a longer duration is used to separate any two digits. An even longer duration is used to separate any two groups of digits for consecutive transmissions of a power status code. In order to guarantee accurate delivery of power status code, it may be preferable to configure the power receiving device 504 to look for two consecutive matching codes while the power sending device 502 sends the code in consecutive groups of digits.

The power receiving device 504 includes a supply voltage monitor 510 and a power signature decoder 512. The supply voltage monitor 510 determines and generates the received DC voltage level, and the power signature decoder 512 continuously samples the received DC voltage level to determine the nominal received DC voltage level and uses it as a reference to decode the DC power signatures. The decoded DC power signatures are translated back to the power status signals and made available to the rest of the system.

Figure 6:
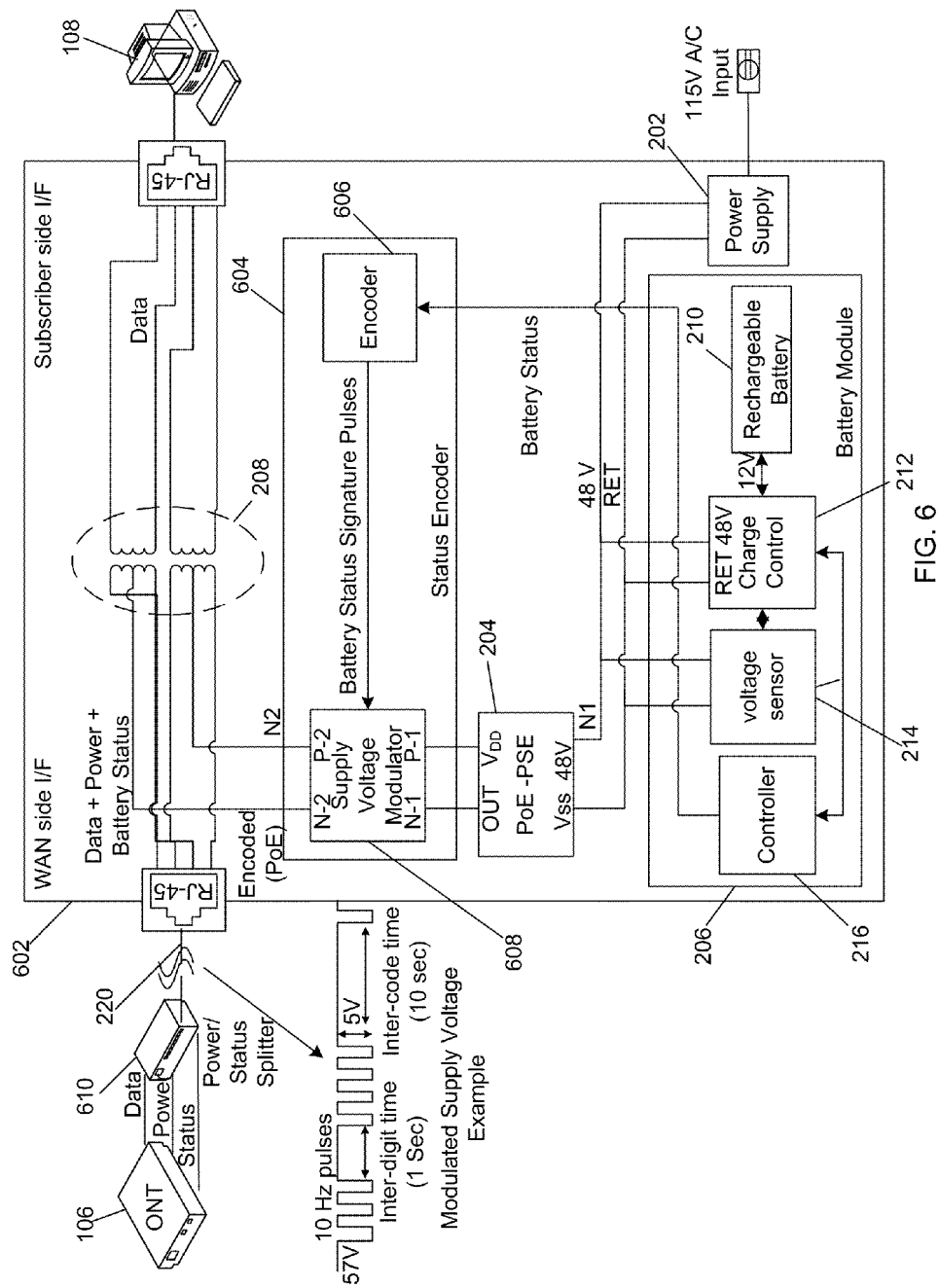
FIG. 6 is block diagram of a power/status injector in accordance with an embodiment of the present invention.
Figure 7:
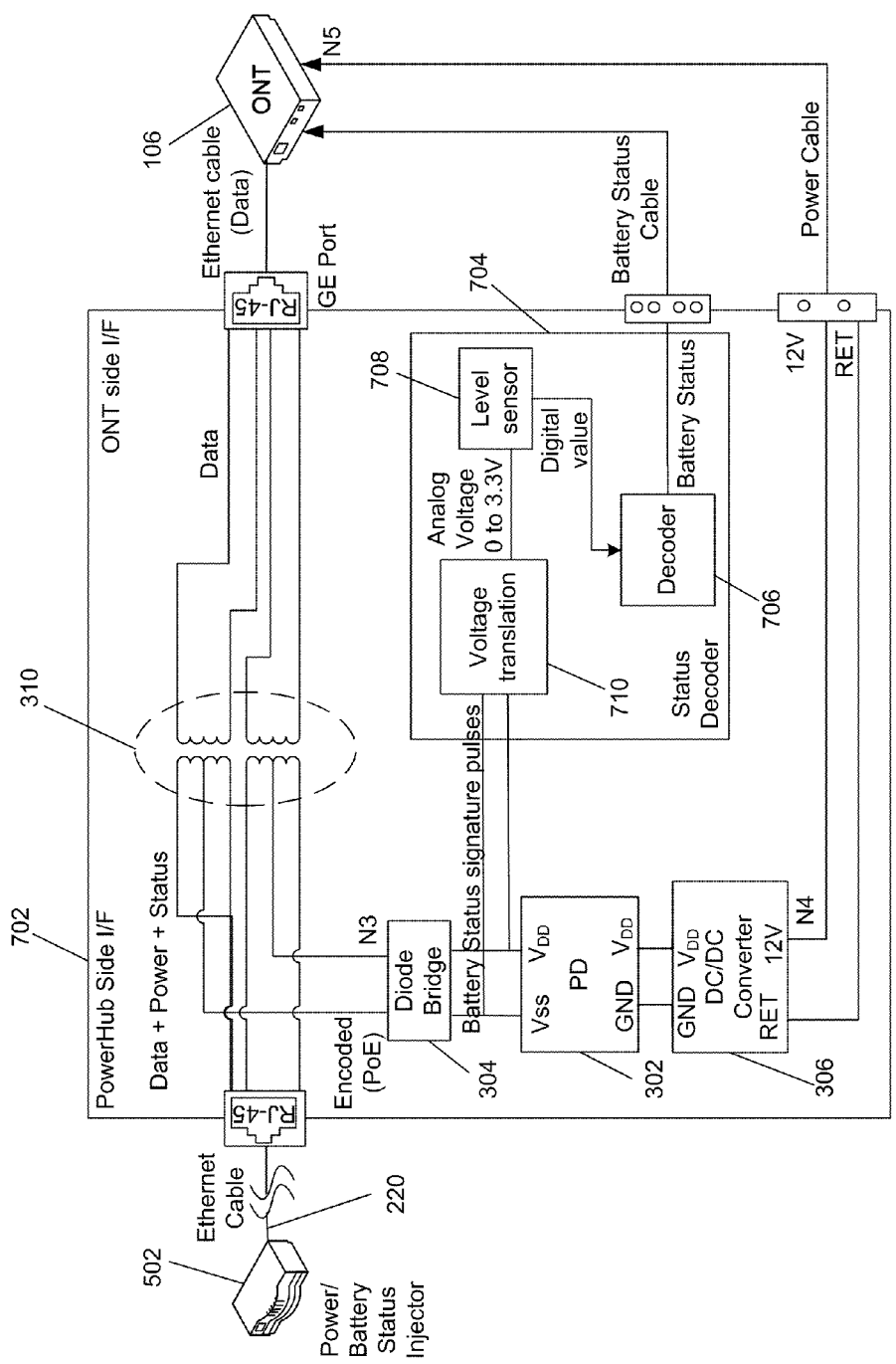
FIG. 7 is a block diagram of a power/status splitter in accordance with an embodiment of the present invention.

FIGS. 6 and 7 are detailed block diagrams of an embodiment of the power sending device 502 and power receiving device 504, respectively. Referring first to FIG. 6, there is shown a block diagram of a power/status injector 602 that illustrates an example of the subscriber end of a Fiber-To-The-Home (FTTH) network in accordance with an embodiment of the present invention. As described in greater detail below, power/status injector 602 provides battery status information over the same pair of wires carrying data and power by modulating the operating power voltage which indicates the status of the battery.

It should be noted that the power/status injector 602 utilizes some similar components as the power injector 102 discussed above with reference to FIG. 2, wherein like reference numerals refer to like elements.

As shown in FIG. 6, the power/status injector 602 includes a status encoder 604, which in turn comprises an encoder 606 and a supply voltage modulator 608. The encoder 604 receives the rechargeable battery status via, for example, a four-wire connection (corresponding to the battery status cable 218 of FIG. 2) from the controller 216. The encoder 604 translates the rechargeable battery status into a series of pulses, which is provided to the supply voltage modulator 608.

The supply voltage modulator 608 is inserted along the power supply path between the power source device 204 and the transformer 208 center taps. The supply voltage modulator 608 modulates the rechargeable battery status pulses onto the power signals as described in greater detail below.

In operation, the status encoder 604, which includes a look-up table, receives the battery status information output by controller, looks up a two decimal digit power status code that is associated with the status information, and delivers the code as a set of pulses to the supply voltage modulator. Preferably, the pulses comprise a set of two binary pulse trains at 10 Hz each with 50% duty cycle representing two decimal digits, wherein a digit 0 may be transmitted as a pulse train of 10 pulses. An inter-pulse train interval is set at a pre-determined interval, such as 1 second. The most significant digit is delivered first. The set is repeated at a rate compatible with the update rate of battery status information, such as every 10 seconds. The supply voltage modulator 608 varies the output voltage in accordance with the set of pulses such that the supply voltage is reduced by a pre-determined amount, such as 5 VDC, in a pattern corresponding to the set of pulses indicating the battery status. The modulated supply voltage is placed on two pairs of Ethernet cable via center taps of data interfacing transformers 208.

In the embodiment of the modulated voltage supply example illustrated in FIG. 6, the reference voltage level is 54 VDC and the voltage drop is 5 VDC. Each pulse has a duration of 1 Hz. and the inter-digit duration is about 1 second. This pattern is repeated every 10 seconds. In this example, the number of voltage drops corresponds to each digit. Accordingly, the pulse sequence illustrated in FIG. 6 of the first digit corresponds to a "3" and the second digit corresponds to a "4," thereby yielding a battery status code of "34." It should be noted that these values are used for illustrative purposes only and, accordingly, other values may be used.

Table 1 illustrates example code words that may be used to map battery alarm statuses to a two digit decimal number. It should be noted that these values are provided for illustrative purposes only and that other mappings, including fewer or more statuses, may be used.

TABLE 1

| Power Status Code (2-digit decimal) | Battery Missing | Replace Battery | Low Battery | On Battery |
|---|---|---|---|---|
| 11 |  |  |  |  |
| 12 |  |  |  | X |
| 13 |  | X |  |  |
| 14 |  | X |  | X |
| 15 |  |  | X |  |
| 16 |  |  | X | X |
| 17 |  | X | X |  |
| 18 |  | X | X | X |
| Null | X |  |  |  |

Figure 3:
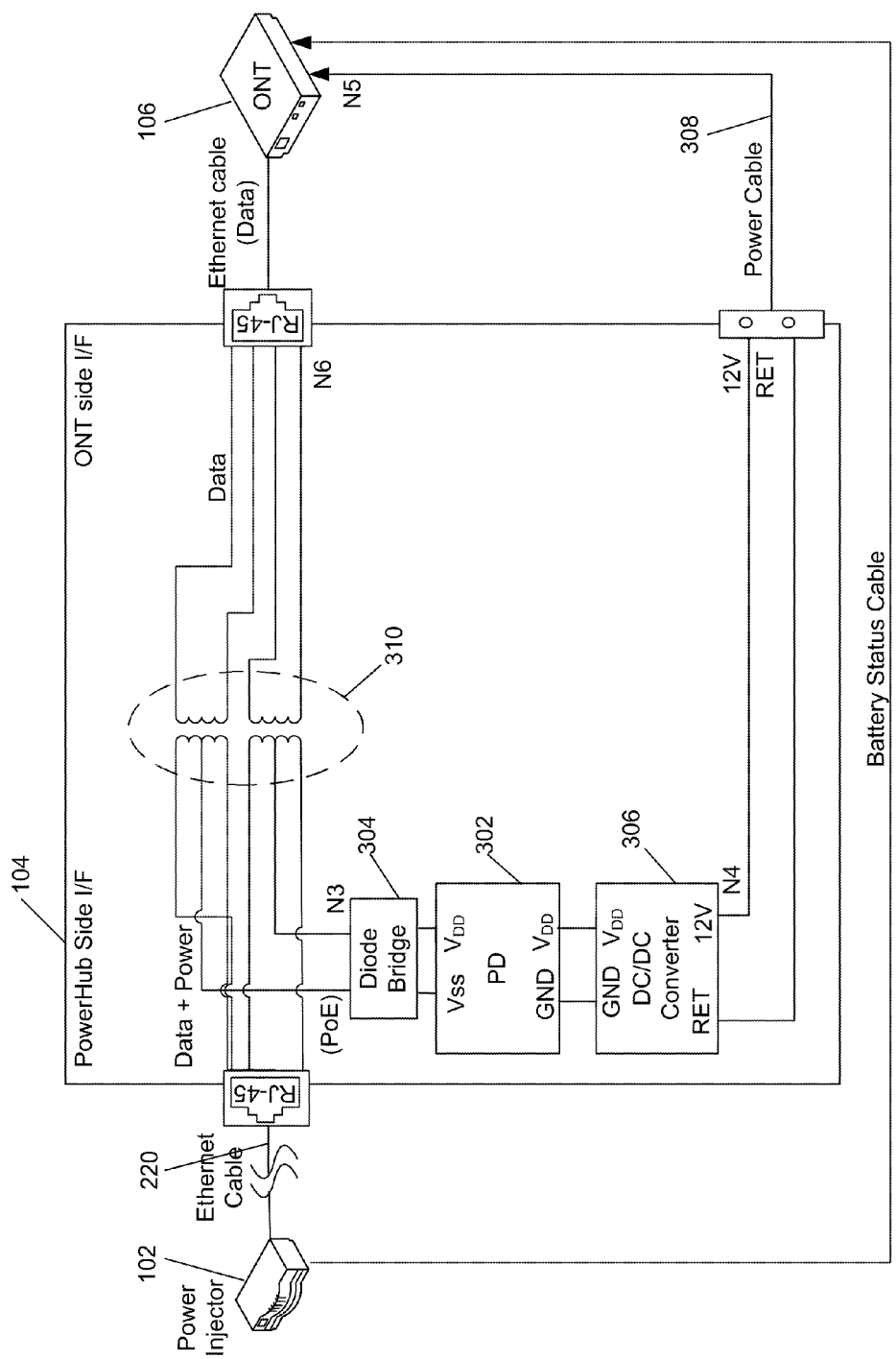

FIG. 7 illustrates a power/status splitter 702 in accordance with an embodiment of the present invention. It should be noted that the power/status splitter 702 utilizes some similar components as the power splitter 104 discussed above with reference to FIG. 3, wherein like reference numerals refer to like elements.

The power/status splitter 702 includes a status decoder 704, which comprises a decoder 706, a level sensor 708, and a voltage translator 710. The voltage decoder 706 is coupled to the power signals between the diode bridge 304 and the PD device 302. The voltage decoder 706 maps the supply voltage range (e.g., 30 V to 54 V) to a logic level range (e.g., 0 to 3 V).

Figure 4:
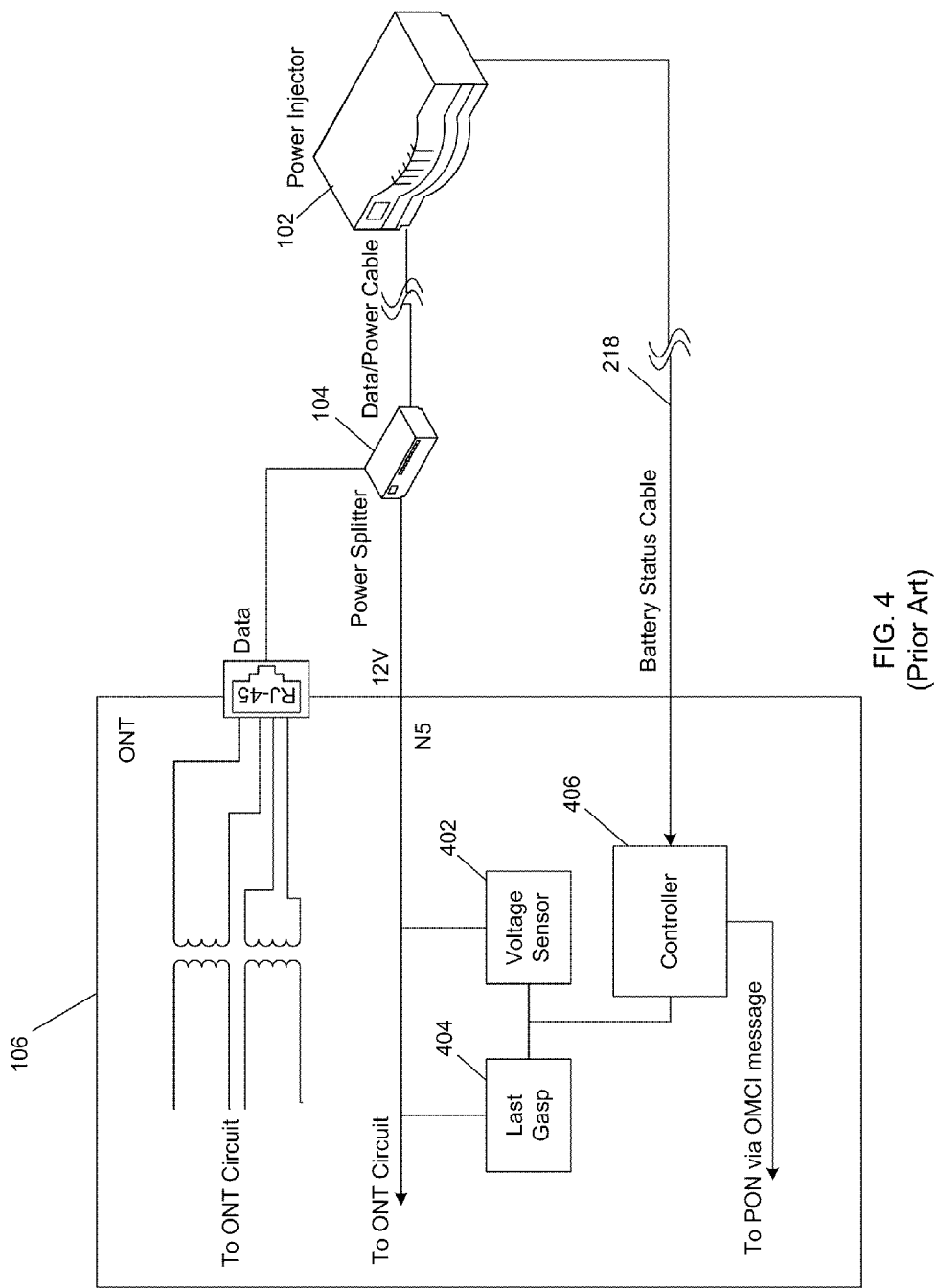

The level sensor 708 converts the logic level range analog voltage into a digital value (e.g., an 8-bit or 16-bit digital value), which the status decoder 704 decodes into a battery status for the controller 406 of the ONT 106 (see FIG. 4) to interpret. From these digital values, the controller 406 intelligently determines the received alarm status signature with respect to steady state operating conditions of the received supply voltage. The controller 406 then recreates the status information as four separate isolated signals along with a return signal on patch cable for ONT 106 to report to the management system via the OMCI.

Figure 1:
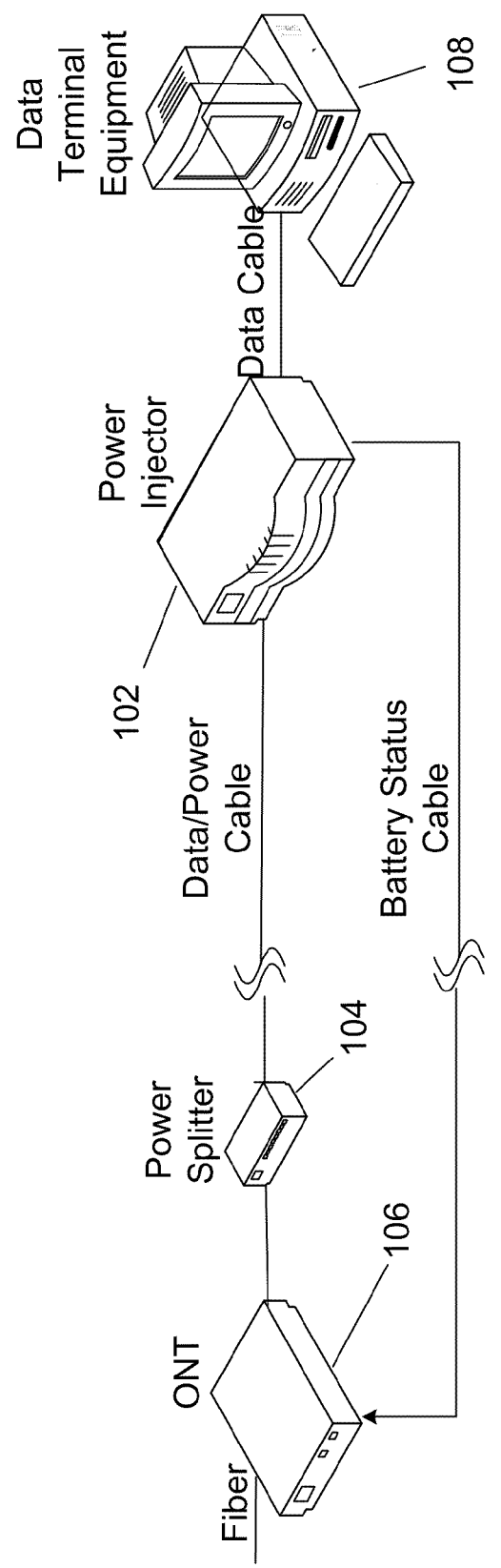
FIGS. 1-4 illustrate portions of an optical network.
Figure 2:
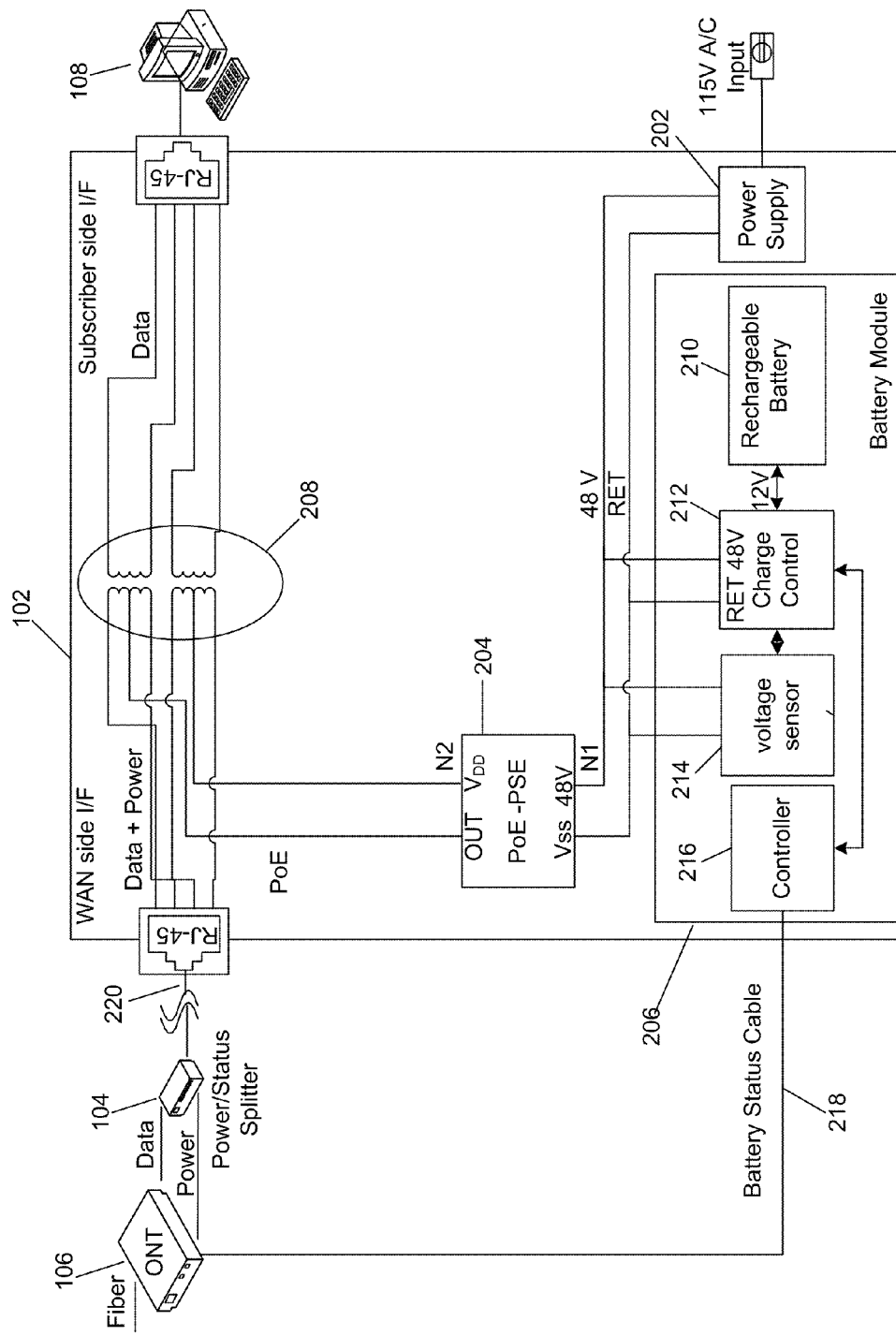

To supply the ONT 106 with DC power, a nominal voltage level (e.g., 54 V for line power or 48 V for battery power) is maintained by the battery module 206 (see FIG. 2). The voltage delivered at the ONT 106 will be less (e.g., acceptable range of 30V to 54V) and depends upon the ONT 106 load, type and condition of the wiring cable, and distance between the battery module 206 and the ONT 106. Because the conditions that determine the voltage at the ONT 106 normally stays unchanged for a given subscriber location, the received DC voltage level also stays constant (nominal received DC voltage level).

Given the nominal received DC voltage level at the ONT 106, it can be used as a reference point to detect any fluctuation in the received voltage level. The power statuses are delivered as DC voltage signatures, each consisting of a series of precisely defined DC voltage changes. The value for the change in voltage level and the duration of the change are determined so the DC power signatures can be easily distinguished from other voltage level fluctuations resulting from normal operational events (e.g., POTS ringing).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A power and status distribution system comprising:
   a power/status sending device configured to receive a status indicator, a data signal, and an input DC power signal, the power/status sending device comprising:
      a supply voltage modulator configured to modulate the DC power signal in accordance with the status indicator thereby creating a modulated DC power signal; and
      a first transformer configured to receive the modulated DC power signal and to provide the data signal and the modulated DC power signal over a first ethernet cable connected to a first output port; and
   a power/status receiving device connected to the first ethernet cable and further connected to, and separate from, an optical network terminal (ONT), the power/status receiving device configured to receive the modulated DC power signal and the data signal, the power/status receiving device comprising:
- a second transformer configured to receive the data signal and the modulated DC power signal from the first ethernet cable, and configured to provide the data signal to the ONT over a second Ethernet cable connected to a third output plug; and
- a status decoder configured to decode the modulated DC power signal to determine the status indicator, to provide the status indicator to the ONT over a status cable connected to a first output plug, and to provide a DC power signal to the ONT over a power cable connected to a second output plug.

2. The power and status distribution system of claim 1, wherein the power/status sending device further comprises:
- an encoder configured to receive a status indicator and to generate a series of status pulses; and
- wherein the supply voltage modulator is further configured to receive the series of status pulses and a supply voltage from a power source device and to modulate the supply voltage in accordance with the series of status pulses, thereby creating the modulated DC power signal.

3. The power and status distribution system of claim 1, wherein the status decoder comprises:
- a voltage translator configured to map a supply voltage range to a logical voltage level;
- a voltage level sensor configured to convert the logical voltage level to a digital value; and
- a decoder configured to translate the digital value to a battery status code.

4. The power and status distribution system of claim 1, wherein the status indicator comprises a battery status indicator.

5. The power and status distribution system of claim 1, wherein the DC power signal is provided by a battery or another power source.

6. The power and status distribution system of claim 1, wherein the status indicator is a status indicator for a first power source, and wherein the input DC power signal is switchable between the first power source and a second power source separate from the first power source.

7. A method of providing status information, the method comprising:
- receiving a supply voltage;
- modulating the supply voltage to supply an output modulated voltage on a pair of wires such that the output modulated voltage is modulated between two voltage levels, the modulation including a series of pulses representing an input status indicator;
- transmitting the output modulated voltage and a data signal over a single cable;
- receiving the output modulated voltage and the data signal;
- separating the output modulated voltage from the data signal;
- decoding the output modulated voltage to determine an output status indicator and generate an output supply voltage;
- providing the output status indicator to an optical network terminal (ONT) through a status output port and over a status cable connected to the ONT; and
- providing the output supply voltage to the ONT through a power output port over a power cable connected to the ONT, the power cable separate from the status cable.

8. The method of claim 7, wherein the input status indicator is a battery status indicator.

9. The method of claim 7, wherein the decoding comprises:
- translating the output modulated voltage to a logical level voltage; and
- converting the logical level voltage to a digital value.

10. The method of claim 7, further comprising continuously sampling the received output modulated voltage to determine a nominal received DC voltage level.

11. The method of claim 7, further comprising transmitting the output modulated voltage over an Ethernet cable.

12. The method of claim 7, further comprising transmitting the output modulated voltage over a coaxial cable.

13. A status communication system comprising:
- a power/battery status injector configured to receive a data signal from an external device, the power/batter status injector comprising:
  - a battery module;
  - an encoder configured to receive a status indicator from the battery module and encode the status indicator as a series of pulses;
  - a voltage modulator coupled to an input voltage source and to a power cable the voltage modulator configured to modulate the input voltage source in accordance with the series of pulses to generate a modulated power signal on the power cable; and
  - a first transformer coupled to the power cable and configured to receive the modulated power signal and to provide the data signal and the modulated power signal to a first output port and over a first ethernet cable; and
- a power/status splitter configured to receive the data signal and the modulated power signal, the power/status splitter connected to the first ethernet cable and comprising:
  - a second transformer configured to receive the data signal and the power signal from the first ethernet cable, and configured to provide the data signal through a second output port and over a second ethernet cable to a data input of an optical network terminal (ONT); and
  - a status decoder configured to generate a status information from the modulated power signal, and to provide status information through a status output port and over a battery status cable to a status input port of the ONT, and further configured to provide a DC power signal to the ONT through a power output port and over an output power cable separate from the battery status cable and to a power input port of the ONT separate from the status input port.

14. The status communication system of claim 13, wherein the encoder is further configured to encode the status indicator as varying a DC voltage level between a first voltage level and a second voltage level, the first voltage level and the second voltage level being acceptable voltage levels to operate a power receiving device.

* * * * *

UNITED STATES PATENT AND TRADEMARK OFFICE
CERTIFICATE OF CORRECTION

PATENT NO. : 8,509,422 B2
APPLICATION NO. : 12/173862
DATED : August 13, 2013
INVENTOR(S) : Wang et al.

Page 1 of 1

It is certified that error appears in the above-identified patent and that said Letters Patent is hereby corrected as shown below:

In the Claims

In Col. 10, line 19, claim 13, delete "power/batter" and insert --power/battery--.

Signed and Sealed this
Twenty-fourth Day of September, 2013

Teresa Stanek Rea
*Deputy Director of the United States Patent and Trademark Office*